United States Patent
Yamaguchi et al.

[11] Patent Number: 6,107,708
[45] Date of Patent: Aug. 22, 2000

[54] BRUSHLESS MOTOR

[75] Inventors: Mineo Yamaguchi, Obu; Hideto Matsuzaki, Kosai; Keisuke Sasaki, Toyokawa; Masaaki Shimizu, Toyohashi; Shinji Iwama, Nagoya; Satoru Asai, Ichinomiya, all of Japan

[73] Assignee: Asmo, Co., Ltd., Japan

[21] Appl. No.: 09/268,409

[22] Filed: Mar. 15, 1999

[30] Foreign Application Priority Data

Mar. 16, 1998 [JP] Japan .................................. 10-065455
Jan. 25, 1999 [JP] Japan .................................. 11-016164

[51] Int. Cl.[7] .................................................. H02K 9/00
[52] U.S. Cl. .............................................................. 310/58
[58] Field of Search ................................. 310/64, 62, 63, 310/58, 52, 53, 88, 68 R; 361/688, 690

[56] References Cited

U.S. PATENT DOCUMENTS

| | | | |
|---|---|---|---|
| 2,596,783 | 3/1952 | Moore | 101/462 |
| 3,644,066 | 2/1972 | Heob et al. | 417/354 |
| 4,128,364 | 12/1978 | Papst et al. | 417/354 |
| 4,428,719 | 1/1984 | Hayashibara et al. | 417/354 |
| 4,554,473 | 11/1985 | Muller | 310/67 R |
| 4,554,491 | 11/1985 | Plunkett | 318/254 |
| 4,840,222 | 6/1989 | Lakin et al. | 165/47 |
| 4,883,982 | 11/1989 | Forbes et al. | 310/62 |
| 5,049,769 | 9/1991 | Reinhardt et al. | 310/64 |
| 5,217,353 | 6/1993 | Filippis | 417/368 |
| 5,245,237 | 9/1993 | Fisher et al. | 310/89 |
| 5,327,064 | 7/1994 | Arakawa et al. | 318/801 |
| 5,763,969 | 6/1998 | Metheny et al. | 310/62 |
| 5,783,881 | 7/1998 | Best et al. | 310/68 C |
| 5,925,947 | 7/1999 | Kajiwara et al. | 310/64 |

*Primary Examiner*—Nestor Ramirez
*Assistant Examiner*—Joseph Waks
*Attorney, Agent, or Firm*—Madson & Metcalf

[57] ABSTRACT

A brushless motor includes a stator attached to a motor case and a rotor. A circuit substrate is attached to the motor case. The substrate includes an electric circuit, which supplies electric current to the stator thereby rotating the rotor. A fan generates and moves air in accordance with rotation of the rotor. A duct guides some of the air moved by the fan to the stator. A flange extends from the stator. The air guided by the duct flows along the flange. This structure reduces the size of the brushless motor while increasing its power.

19 Claims, 2 Drawing Sheets

BRUSHLESS MOTOR

BACKGROUND OF THE INVENTION

The present invention relates to a brushless motor used in a fan of an on-vehicle air conditioner.

A typical fan used in an on-vehicle air conditioner includes an outer-rotor type brushless motor. The motor has a stator fixed to a case and a rotor located about the stator. When fed with exciting current, the stator rotates the rotor. The stator has a centerpiece, a core and a wire wound about the core.

The core wire of the stator receives exciting current from an exciting circuit mounted on a control substrate. The current generates a magnetic field, which, in turn, rotates the rotor. The control substrate is either integrated with the case and located in the vicinity of the case or is separated from the stator and the brushless motor.

The control substrate includes a choke coil, which is an element in the exciting circuit. The choke coil eliminates high frequency noise in exciting current supplied from the exciting circuit to the core wire. The choke coil is connected to a power source and an element of the exciting circuit in series.

Recently, there has been an increasing demand for smaller brushless motors with greater power. To increase the power of a brushless motor, it is necessary to increase the magnitude of exciting current supplied from the exciting circuit to the core wire.

Increasing the magnitude of the exciting current raises the temperature of the core wire and elements on the substrate. In other words, the core wire and the substrate are two heat sources in the motor. Therefore, if the stator and the control substrate are mounted on the motor case, that is, if the stator and the control substrate are close to each other, increasing the magnitude of the exciting current rapidly raises the temperature of the motor. The heat of the motor increases the electrical resistance of the core wire. This, in turn, decreases the current in the core wire and lowers the power of the motor. In some cases, the heat burns and breaks the core wire.

On the other hand, if the control substrate is located away from the stator, that is, if the two heat sources are far from each other, increasing the exciting current does not significantly increase the temperature of the motor. However, this construction requires relatively long wires to connect the stator and the substrate. Further, the current-carrying capacity of elongated connecting wires may limit the magnitude of the exciting current supplied to the core wire. This prevents the power of the motor from being increased to a desired level. The construction also requires a separate case for the control substrate, which enlarges the size of the brushless motor.

Increasing the exciting current for enhancing the power of the motor raises the temperature of the choke coil. The raised temperature increases the resistance of the choke coil and thus lowers the power of the motor. The heat also may burn and break the choke coil.

Enlarging the choke coil increases the current-carrying capacity of the choke coil thereby suppressing the temperature increase of the choke coil. However, enlarging the choke coil enlarges the control substrate. A larger substrate requires a larger case thereby increasing the size of the motor.

If the choke coil is omitted from the substrate, electromagnetic noise generated by exciting current generates radio noise in the car radio or causes other electronic interference.

SUMMARY OF THE INVENTION

Accordingly, it is an objective of the present invention to provide a small brushless motor that is capable of increasing the power.

To achieve the foregoing and other objectives and in accordance with the purpose of the present invention, a brushless motor is provided. The brushless motor has a motor case, a stator attached to the motor case, a rotor that rotates relative to the motor case and a circuit substrate attached to the motor case. The circuit substrate includes an electrical circuit to supply current to the stator to rotate the rotor, a fan for moving air in accordance with the rotation of the rotor, a duct for guiding some of the air moved by the fan to the stator, and a radiator extending from the stator. The air guided by the duct flows along the radiator.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
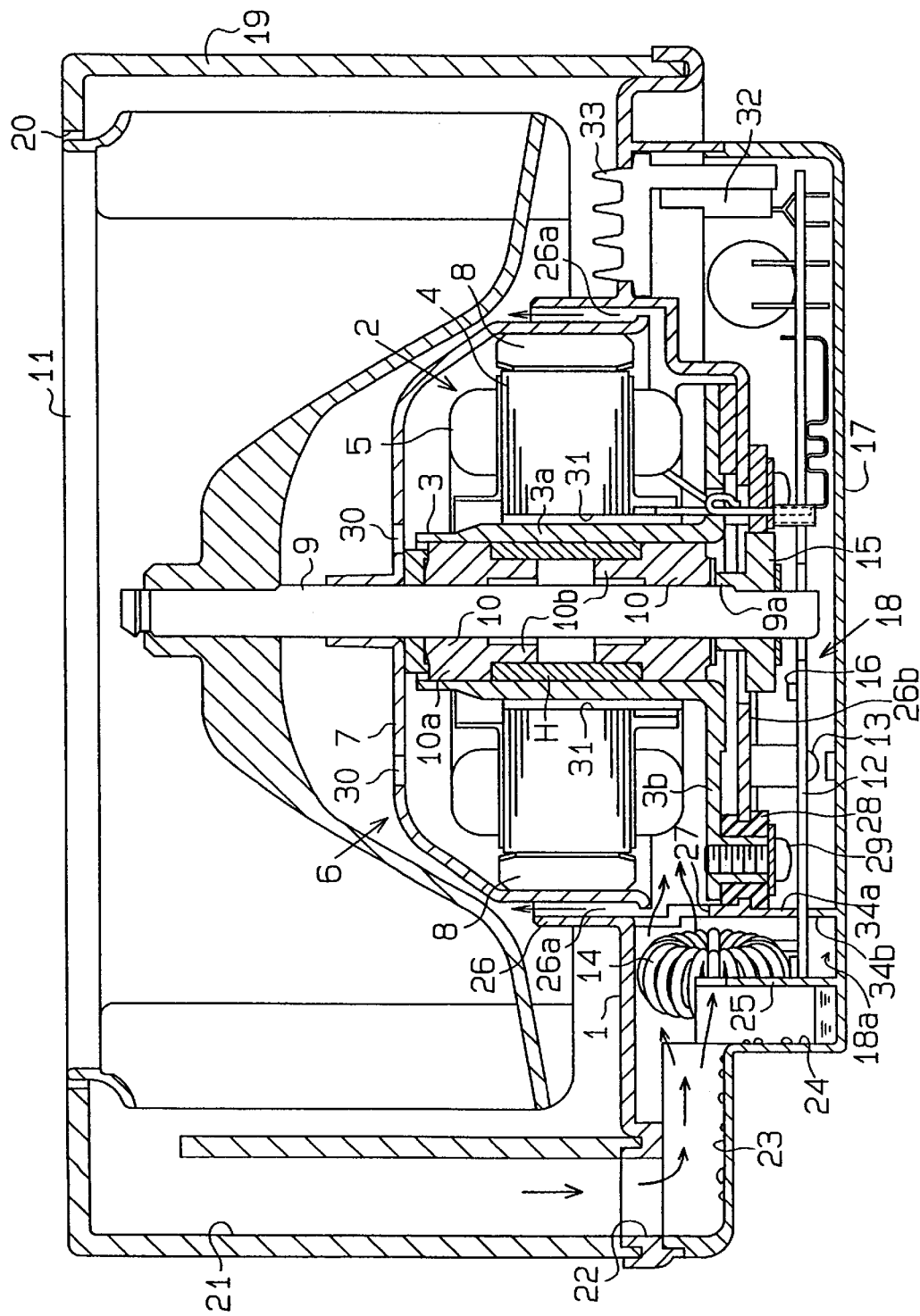
FIG. 1 is a cross-sectional view illustrating a brushless motor according to one embodiment of the present invention.
Figure 2:
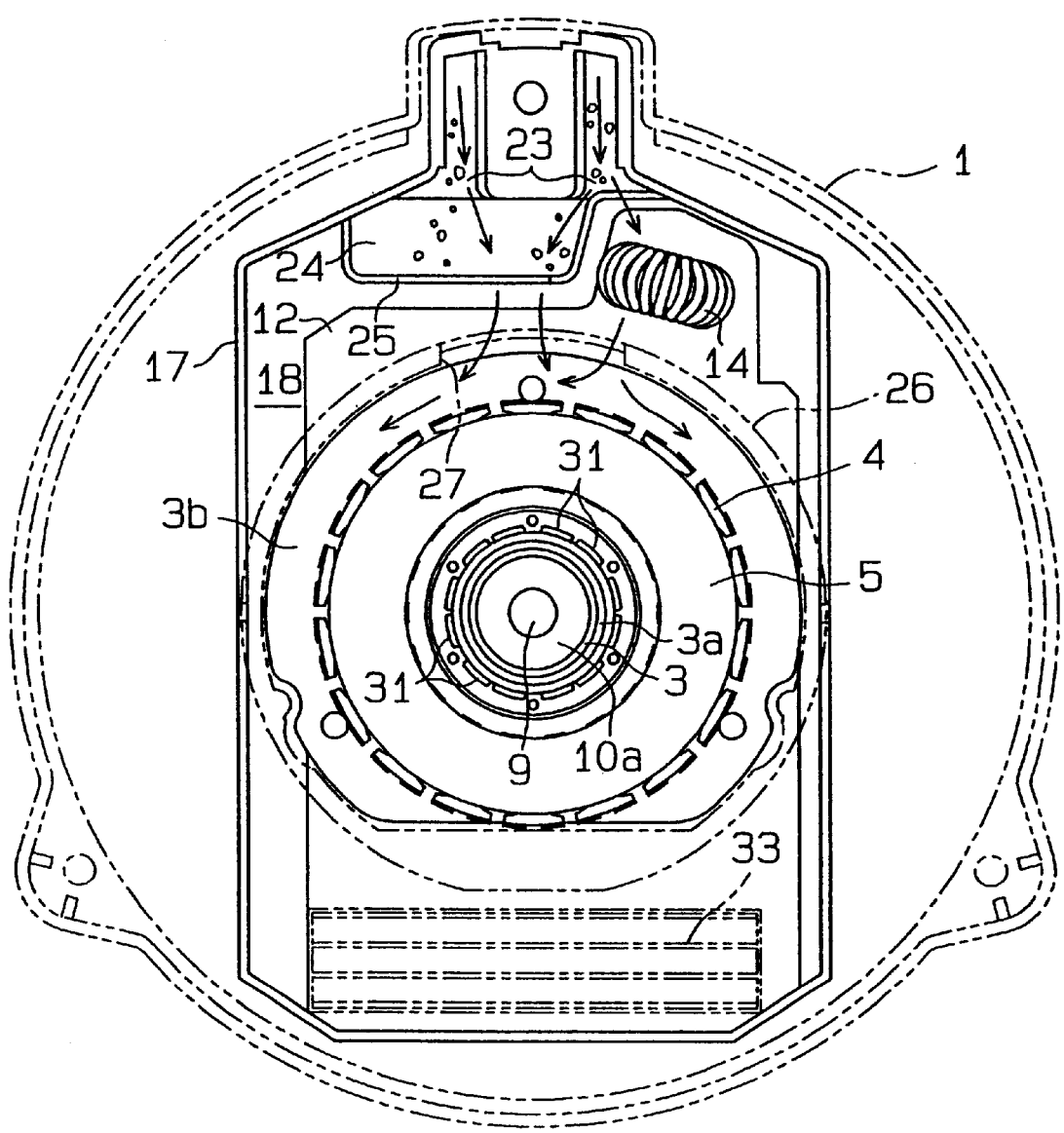
FIG. 2 is a plan view illustrating a lower case and a stator of the brushless motor of FIG. 1.

One embodiment of the present invention will now be described with reference to FIGS. 1 and 2. As shown in FIG. 1, a stator 2 is fixed to a motor holder 1 made of synthetic resin. The stator 2 includes a centerpiece 3, a core 4 and a wire 5 wound about the core 4.

The stator 2 rotatably supports a rotor 6. The rotor 6 has a yoke 7 covering the stator 2, magnets 8 and a rotary shaft 9 press fitted in the center of the yoke 7. The rotary shaft 9 extends through the centerpiece 3 and is rotatably supported by a pair of sliding bearings 10.

The centerpiece 3 is made of a metal having a high heat conductivity and includes a cylinder 3a and flange 3b formed at an end of the cylinder 3a. A cylindrical holder bearing H is press fitted in the cylinder 3a at the axial center of the cylinder 3a. Each bearing 10 has a large diameter portion 10a and a small diameter portion 10b. The outer diameter of the large diameter portion 10a is substantially equal to the inner diameter of the cylinder 3a, and the diameter of the small diameter portion 10b is substantially equal to the inner diameter of the holder bearing H. The inner diameter of the small diameter portion 10b is slightly larger than the inner diameter of the large diameter portion 10a. The large diameter portion 10a is press fitted in the cylinder 3a with its inner end contacting the holder bearing H. The small diameter portion 10b is press fitted in the holder bearing H. The rotary shaft 9 extends through and is rotatably supported by the bearings 10. A fan 11 is fixed to the distal end of the rotary shaft 9.

A substrate 12 is fastened to the lower side of the motor holder 1 by one or more screws 13. The substrate 12 has multiple elements constituting an exciting circuit and a choke coil 14. The substrate includes an electrical circuit to supply a current to the stator to rotate the rotor. The choke coil 14 eliminates high frequency noise in current supplied from the exciting current to the wire 5. The rotor 6 rotates when the exciting circuit sends exciting current to the core wire 5 via the choke coil 14. Accordingly, the rotary shaft 9 and the fan 11 are rotated, which creates airflow.

A disk shaped sensor magnet 15 is fitted to the lower end of the rotary shaft 9. A Hall element 16 is located in the vicinity of the sensor magnet 15. Rotation of the rotor 6 causes changes in the flux through the sensor magnet 15. The flux changes are detected by the Hall element 16. Accordingly, the rotational angle of the rotor 6 is detected. Exciting current is controlled based on the detected rotational angle.

A disk-shaped lower case 17 is fixed to the motor holder 1 and covers the lower side of the substrate 12. The lower case 17 is made of the same synthetic resin as the motor holder 1 and is thinner than the motor holder 1. A chamber 18 is defined between the motor holder 1 and the lower case 17 for accommodating the substrate 12.

A blower case 19 is attached to the motor holder 1 to cover the fan 11. An opening 20 is formed in the upper portion of the blower case 19. The opening 20 is connected to an intake duct (not shown), which introduces air from the exterior of the vehicle or from the passenger compartment. An outlet opening (not shown) is formed in the side wall of the blower case 19. The outlet opening is connected with a blowing duct. Rotation of the fan 11 draws air through the opening 20. The drawn air forms a vortex and is guided to the outlet opening through the blower case 19. The air is then sent to the passenger compartment or to an air conditioner through the blowing duct.

A flow dividing duct 21 is formed in the blower case 19. The flow dividing duct 21 introduces some of the air introduced from the opening 20. The motor holder 1 has an air hole 22. The air hole 22 is located in the vicinity of the choke coil 14 and communicates with the air dividing duct 21.

An air passage 23 is defined between the motor holder 1 and the lower case 17. The air passage 23 connects the air hole 22 with the chamber 18. As shown in FIG. 2, the passage 23 extends toward the choke coil 14. A reservoir 24 is located next to the chamber 18. The bottom of the reservoir 24 is located on the same plane as the bottom of the camber 18. A partition 25 extends from the bottom of the lower case 17 and separates the reservoir 24 from the chamber 18.

The motor holder 1 includes a cylindrical support 26 in the center to receive the lower portion of the stator 2 and the rotor 6. The cylindrical support 26 has a bottom plate 26b and a guide hole 27. The guide hole 27 connects the chamber 18 with the cylindrical support 26 and guides air from the passage 23 into the cylindrical support 26. A space 26a is defined between the cylindrical support 26 and the yoke 7.

The flange 3b of the centerpiece 3 is secured to the bottom plate 26b of the cylindrical support 26 by a screw 29 with a rubber cushion 28 in between. In this manner, the centerpiece 3 is fixed to the motor holder 1.

A shield wall 34a extends from the bottom of the motor holder 1 in the vicinity of the choke coil 14. The distal end of the shield wall 34a contacts the substrate 12. A shield wall 34b extends from the lower case 17 and contacts the substrate 12 at a position corresponding to the shield wall 34a. The shield walls 34a, 34b define a subchamber 18a in the chamber 18. The subchamber 18a accommodates only the choke coil 14. The flange 3b extends to the vicinity of the guide hole 27. This construction permits smooth airflow from the passage 23 into the yoke 7 through the subchamber 18a.

Air holes 30 are formed in the upper portion of the yoke 7. As shown in FIGS. 1 and 2, the core 4 has recesses in the inner wall. The recesses extend axially and are angularly spaced apart by predetermined intervals. The recesses define air passages 31 between the cylinder 3a and the core 4.

A transistor 32 is mounted on one side of the substrate 12. A heat sink 33 is secured to the transistor 32. The heat sink 33 is exposed from the top surface of the motor holder 1.

When the exciting circuit supplies exciting current to the core wire 5, the rotor 6 is rotated. Accordingly, the fan 11 is rotated. Rotation of the fan 11 introduces air from the intake duct and sends the air to the outlet duct through the blower case 19. At this time, some of the introduced air flows into the subchamber 18a through the flow dividing duct 21, the air hole 22 and the passage 23. The air cools the choke coil 14.

The air is then guided to the interior of the cylindrical support 26 through the guide hole 27. Specifically, the shield walls 34a, 34b force all the cooling air into the cylindrical support 26 through the guide hole 27. The cooling air flows along the flange 3b of the centerpiece 3 thereby cooling the centerpiece 3. The cooling air also flows into the yoke 7 and cools the core wire 5.

Thereafter, the cooling air flows out of the yoke 7 through the holes 30. At this time, the cooling air flows between the magnets 8 and the core 4 and through the passage 31. Some of the cooling air in the cylindrical support 26 flows out of the cylindrical support 26 through the space 26a thereby cooling the circumferential wall of the yoke 7.

If air introduced in the blower case 19 contains raindrop or snow or is very humid, water drops may adhere to the inner wall of the flow dividing duct 21. The droplets flow to the reservoir 24 along the inner walls of the duct 21 and the passage 23. When dry air is introduced in the duct 21, the air evaporates water stored in the reservoir 24.

The brushless motor according to the illustrated embodiment has the following advantages.

(1) Rotation of the fan 11 sends air from the blower case 19 to the outlet duct. Some of the air flows into the subchamber 18a through the hole 22 and the passage 23. The air guided into the subchamber 18a effectively cools the choke coil 14. Thus, the resistance of the choke coil 14 is not excessively increased by heat. This construction permits the exciting current supplied to the core wire 5 to be increased without increasing the size of the choke coil 14. The size of the motor can therefore be reduced while increasing the power of the motor.

(2) The air guided into the subchamber 18a flows into the yoke 7 through the hole 27, which efficiently cools the stator 2.

(3) The flange 3b enlarges the surface area of the centerpiece 3. This effectively cools the centerpiece 3 by convection. That is, heat transferred from the core wire 5 to the centerpiece 3 is efficiently transferred from the flange 3b. therefore, the flange 3b serves as a radiator.

(4) Air guided into the yoke 7 cools the core 4 and the core wire 5. That is, air flows through the air passages 31 between the cylinder 3a and the core 4 and effectively cools the core 4 and the wire 5.

(5) The illustrated embodiment allows the substrate 12, which includes the transistor 32, to be integrated with the motor holder 1. That is, since the stator 2 is efficiently cooled by airflow, the transistor 32, which generates heat, does not increase the temperature of the stator 2. Thus, the illustrated embodiment reduces the size of the motor while increasing its power.

(6) The centerpiece 3, the core 4 and the core wire 5 are cooled by air and, in turn, heat the air. The heated air flows through the passages 31 and out of the yoke 7 through the holes 30. Air also flows through the space 26a between the yoke 7 and the cylindrical support 26 thereby cooling the yoke 7. This construction effectively cools the yoke 7.

(7) Water drops that may form on the inner wall of the flow dividing duct 21 flow into the reservoir 24. Therefore, water does not enter the chamber 18. This prevents the motor from malfunctioning due to water contacting the substrate 12. Further, the reservoir 24 is easily separated from the chamber 18 by forming the partition 25.

(8) Air introduced in the blower case 19 through the intake duct can contain some water. However, the water is prevented from entering the chamber 18. Therefore, the illustrated embodiment increases the flexibility of the layout of the intake duct by permitting air from the lower side of the windshield, which may contain water, to be supplied to the blower. In other words, the intake duct needs no water-removal device to prevent water from entering the blower. Further, the intake duct may extend directly downward from below the windshield to the opening 20 of the blower case 19.

(9) The water stored in the reservoir 24 is evaporated by dry air introduced into the flow dividing duct 21. Thus, the reservoir 24 requires no drain.

It should be apparent to those skilled in the art that the present invention may be embodied in many other specific forms without departing from the spirit or scope of the invention. Particularly, it should be understood that the invention may be embodied in the following forms.

A number of projections and recesses or fins may be formed on the flange 3b of the centerpiece 3. This increases the surface area of the centerpiece 3 thereby cooling the centerpiece 3 more effectively.

The reservoir 24 may be located anywhere as long as it is below the intake passage 23. For example, the reservoir 24 may be located directly below the flow dividing duct 21.

Therefore, the present examples and embodiments are to be considered as illustrative and not restrictive and the invention is not to be limited to the details given herein, but may be modified within the scope and equivalence of the appended claims.

What is claimed is:

1. A brushless motor comprising:
   a motor case;
   a stator attached to the motor case;
   a rotor that rotates relative to the motor case;
   a circuit substrate attached to the motor case, wherein the circuit substrate includes an electrical circuit to supply a current to the stator to rotate the rotor;
   a fan for producing a flow of air in accordance with the rotation of the rotor;
   a duct for guiding some of the flow of air to that stator, wherein the duct has an inner wall;
   a radiator extending form the stator, wherein the air guided by the duct flows along the radiator; and
   a reservoir for receiving water droplets from the inner wall of the duct, the reservoir being located upstream the stator to prevent the droplets from reaching the stator.

2. The brushless motor according to claim 1, wherein the stator includes a centerpiece, a core located about the centerpiece and a wire wound about the core, wherein the radiator extends from the centerpiece.

3. The brushless motor according to claim 2, wherein the radiator includes a flange formed integrally with the centerpiece.

4. The brushless motor according to claim 3, wherein the centerpiece is made of a metal having a high heat conductivity.

5. The brushless motor according to claim 2, wherein a passage is formed between the centerpiece and the core to allow an airflow.

6. The brushless motor according to claim 1, wherein the electrical circuit on the circuit substrate includes an electrical element for eliminating magnetic noise generated by the current supplied to the stator, and wherein the electrical element is exposed to the air guided by the duct.

7. The brushless motor according to claim 6, wherein the motor case has a chamber for accommodating the circuit substrate and a dividing wall for defining a subchamber in the chamber, wherein the subchamber accommodates the electrical element, and wherein the air guided by the duct flows through the subchamber.

8. The brushless motor according to claim 7, wherein the reservoir is located adjacent to the subchamber, and wherein the motor case further has a partition for separating the reservoir from the subchamber.

9. The brushless motor according to claim 1, wherein the reservoir is located lower than the duct.

10. The brushless motor according to claim 1, wherein the duct has an air inlet, a first portion extending downward from the inlet, wherein the first portion has a lower end, and a second portion laterally extending from the lower end of the first portion to the stator, and wherein the reservoir is located lower than the second portion.

11. The brushless motor according to claim 1, wherein the rotor is supported by the stator such that the rotor surrounds and is rotatable relative to the stator, the motor case having a cylindrical wall surrounding the rotor and the stator, wherein the cylindrical wall has a guide hole for guiding the air form the duct into an inner space of the rotor, and wherein the rotor has an air hole for guiding air out of the inner space of the rotor to the exterior of the rotor.

12. A brushless motor comprising:
   a motor case;
   a stator attached to the motor case, wherein the stator includes a centerpiece, a core located about the centerpiece and a wire wound about the core;
   a rotor supported by the stator to be rotatable relative to the stator, wherein the rotor includes a rotary shaft rotatably supported by the centerpiece and a yoke fixed to the rotary shaft to surround the stator;
   a circuit substrate attached to the motor case, wherein the circuit substrate includes an electrical circuit to supply a current to the wire to rotate the rotor;
   a fan fixed to the rotary shaft, wherein the fan produces a flow of air in accordance with the rotation of the rotor;
   a duct for guiding some of the flow of air produced by the fan to the stator, wherein the duct has an inner wall;
   a heat-radiating flange formed on the centerpiece, wherein the flange is exposed to the air guided from the duct to the stator; and
   a reservoir for receiving water droplets from the inner wall of the duct, the reservoir being located upstream the stator to prevent the droplets from reaching the stator.

13. The brushless motor according to claim 12, wherein the centerpiece is made of a metal having a high heat conductivity.

14. The brushless motor according to claim 12, wherein a passage is formed between the centerpiece and the core to allow airflow.

15. The brushless motor according to claim 13, wherein the electrical circuit on the circuit substrate includes an electrical element for eliminating magnetic noise generated by the current supplied to the wire, and wherein the electrical element is exposed the airflow from the duct.

16. The brushless motor according to claim 15, wherein the motor case has a chamber for accommodating the circuit substrate and a dividing wall for defining a subchamber in the chamber, wherein the subchamber accommodates the electrical element, and wherein air from the duct flows through the subchamber.

17. The brushless motor according the claim 12, wherein the duct has an air inlet, a first portion extending downward from the inlet, wherein the first portion has a lower end and a second portion laterally extending from the lower end of the first portion to the stator, and wherein the reservoir is located lower than the second portion.

18. The brushless motor according to claim 12, wherein the motor case has a cylindrical wall surrounding the rotor and the stator, the cylindrical wall having a guide hole for guiding the air from the duct into an inner space of the yoke, and wherein the yoke has an air hole for guiding air out of the inner space of the yoke to the exterior of the yoke.

19. A brushless motor used in a fan of an on-vehicle air conditioner comprising:

a motor case;

a stator attached to the motor case, wherein the stator includes a centerpiece, a core located about the centerpiece and a wire wound around the core;

a rotor supported by the stator to be rotatable relative to the stator, wherein the rotor includes a rotary shaft rotatably supported by the centerpiece and a yoke fixed to the rotary shaft to surround the stator;

a circuit substrate attached to the motor case, wherein the circuit substrate includes an electrical circuit to supply a current to the wire to rotate the rotor;

a fan fixed to the rotary shaft, wherein the fan produces a flow of air in accordance with the rotation of the rotor;

a dividing duct for guiding some of the flow of air produced by the fan to the stator, wherein the duct has an inner wall;

a heat-radiating flange formed on the centerpiece, wherein the flange is exposed to the air guided from the duct to the stator; and a reservoir for receiving water droplets from the inner wall of the dividing duct and located below the dividing duct and upstream the flange of the centerpiece to prevent the droplets from reaching the stator.

* * * * *